(12) United States Patent
Yamada et al.

(10) Patent No.: US 7,291,064 B2
(45) Date of Patent: Nov. 6, 2007

(54) GAME PROGRAM AND GAME APPARATUS

(75) Inventors: Nobuhiro Yamada, Tokyo (JP); Takuri Chida, Ibaraki (JP)

(73) Assignee: Konami Corporation, Tokyo (JP)

( * ) Notice: Subject to any disclaimer, the term of this patent is extended or adjusted under 35 U.S.C. 154(b) by 669 days.

(21) Appl. No.: 10/474,056

(22) PCT Filed: Nov. 15, 2002

(86) PCT No.: PCT/JP02/11929

§ 371 (c)(1),
(2), (4) Date: Oct. 6, 2003

(87) PCT Pub. No.: WO03/066183

PCT Pub. Date: Aug. 14, 2003

(65) Prior Publication Data

US 2004/0137975 A1    Jul. 15, 2004

(30) Foreign Application Priority Data

Feb. 5, 2002    (JP)    ............................. 2002-027885

(51) Int. Cl.
*A63F 9/24*    (2006.01)
(52) U.S. Cl. ........................................................ 463/1
(58) Field of Classification Search ................. 463/1, 463/9
See application file for complete search history.

(56) References Cited

U.S. PATENT DOCUMENTS 5,829,747 A * 11/1998 Nebel .......................... 273/256
6,179,713 B1 * 1/2001 James et al. .................. 463/42

FOREIGN PATENT DOCUMENTS

| EP | 1 176 533 A | 1/2002 |
|---|---|---|
| JP | 2001-259228 A | 9/2001 |
| JP | 2001-340656 A | 12/2001 |
| JP | 2002-200352 A | 7/2002 |

OTHER PUBLICATIONS

Kou Shibusawa, "Nobunaga no Yabo Sengoku Gun'yuden Hand Book", pub. Jul. 10, 1991, p. 20-21, 22-23, 30-31, Japan.

* cited by examiner

*Primary Examiner*—Robert Pezzuto
*Assistant Examiner*—Dat T. Nguyen
(74) *Attorney, Agent, or Firm*—Duane Morris, LLP

(57) ABSTRACT

Game program has a procedure for determining item price (IVD), for respectively computing price for transfer of a plurality of items to be used in a game every each item, and a procedure for executing the procedure for determining item price when possession state of the item is likely to be changed in the game, and the procedure for determining item price has a procedure for computing price for transfer of the item on the basis of individual data concerning each item and for displaying the computed price. The price for transfer of the item is determined and shown, changed by the individual data concerning each item, so that the player can buy or sell the item with reality similar to economical activities in the actual world.

7 Claims, 3 Drawing Sheets

| (IDC) NAM | CARD NAME | POINT(P) | PLAYER | CPU | STOCK(S) | TOTAL(T) | SALE PRICE (T/S)*P*(50-T) |
|---|---|---|---|---|---|---|---|
| | CARD A | 200 | 2 | 0 | 8 | 10 | ¥10,000 |
| | CARD B | 180 | 0 | 3 | 7 | 10 | ¥10,286 |
| | CARD C | 230 | 1 | 1 | 8 | 10 | ¥11,500 |
| | CARD D | 400 | 0 | 0 | 5 | 5 | ¥18,000 |
| | CARD E | 500 | 3 | 1 | 1 | 5 | ¥112,500 |

IPD (IDC)

PHD (IDC)    AHD (IDC)    ACD (IDC)    HND (IDC)

Fig.3

| (IDC) NAM | | IPD (IDC) | | | | |
|---|---|---|---|---|---|---|
| | | PLAYER | CPU | STOCK(S) | TOTAL(T) | SALE PRICE (T/S)*P*(50-T) |
| | CARD NAME | POINT(P) | | | | |
| | CARD A | 200 | 2 | 0 | 8 | 10 | ¥10,000 |
| | CARD B | 180 | 0 | 3 | 7 | 10 | ¥10,286 |
| | CARD C | 230 | 1 | 1 | 8 | 10 | ¥11,500 |
| | CARD D | 400 | 0 | 0 | 5 | 5 | ¥18,000 |
| | CARD E | 500 | 3 | 1 | 1 | 5 | ¥112,500 |

PHD (IDC)  AHD (IDC)  ACD (IDC)  HND (IDC)

GAME PROGRAM AND GAME APPARATUS

TECHNICAL FIELD

This invention relates to game program of a role-playing game, a card game and the like, and a game machine functioning on the basis of the game program, wherein price of items, such as cards, arms, and magic to be used in the game can be changed.

BACKGROUND ART

In such a conventional game program, the items to be used in a virtual world in the game, such as cards, arms and magic, are transferred by buying or selling at an item shop set in the virtual world with currency or points passing in the virtual world, and the price of transfer is always fixed.

But, the virtual world in such a system is widely different from the actual world where prices are always changed. Owing to this reason, the reality of the game is spoiled and the fun of the game is decreased.

Then, developments of game program and a game machine wherein the price of the item is also fluctuated in the game, thereby increasing reality and fun of the game, are still awaited.

DISCLOSURE OF INVENTION

The invention is game program for changing representation on a display on the basis of predetermined program, through which a player can execute a game; comprising:

the game program having program for determining item price, for respectively computing prices for transfer (such as sale price at a shop set in a game) of a plurality of items to be used in the game every each item, and procedure for executing the program for determining item price when executing a step where possession state of the item to be used in the game is likely to be changed (such as an action of transfer of a card, an action of acceptance of a card, and an action of a battle between players) in the game program, the program for determining item price having a procedure for computing price for transfer of the item on the basis of individual data concerning each item (such as, data concerning name NAM of each card, individual parameter data IPD representing individual characteristic, such as strength or value of each card, and data concerning number of the cards (items) in a game and distribution of their possession state, as shown in FIG. 3) and for displaying the price computed on the display;

the game program further having procedure for rewriting individual data, for rewriting and changing the individual data when changing the possession state of the item.

According to this aspect of the invention, the program for determining item price determines the price for transfer of the item, being changed by the individual data set for each item (such as, data concerning name of each card, individual parameter data representing individual characteristic, such as strength or value of each card, and data concerning number of the cards (items) in a game and distribution of their possession state, as shown in FIG. 3) so as to show to the player, so that the player can buy or sell the item with reality similar to the economical activities in the actual world, thereby increasing the reality and the fun of the game.

Besides, in an another aspect of the invention, the individual data include data concerning number of each item and distribution of its possession state (such as player possession data representing the number of the cards owned by a player, another player possession data representing the number of the cards owned by an another player excluding the player, a virtual player behaving by the CPU 11 as a player on the basis of the game program CGP, for instance, and transferable number data representing the number of the cards set by the game program as a stock at a shop where transfer action is executed)

According to this aspect of the invention, the price for transfer of the item is changed according to the data concerning the number of each item and distribution of its possession state, so that the relation between demand and supply influences the price so as to be determined, thereby increasing the reality of the game.

Besides, in an another aspect of the invention, the individual data include individual parameter data (such as name of each card, and strength or value of each card) for representing individual characteristic of each item.

According to this aspect of the invention, the individual parameter data of each item can change the price for transfer of the item, so that the price can be set, making the best use of the characteristic of each item.

Besides, in an another aspect of the invention, the change of possession state of the item includes change by a procedure for registering an item newly produced by the game program on the basis of data inputted by the player through input means as player's possession (such as card producing program in the game program).

According to this aspect of the invention, the price for transfer of the item can be changed even if the game machine accepts the item which the player bought at an outside shop so that the number of the items in the game can be changed. Then, the game can be made more attractive.

Besides, in an another aspect of the invention, the change of possession state of the item include change made by a procedure for moving item on the basis of the game program, which occurs between the player and an opponent player as a battle result between both players.

According to this aspect of the invention, the change of the possession state of the item in the game by moving the item between the player and the other player can also influence the price for transfer of the item, so that the game can be made more attractive.

Besides, in an another aspect of the invention, the change of possession state of the item include change made by a procedure for exchanging item on the basis of the game program, which occurs between the player and an opponent player as a result of exchanging item between both players.

According to this aspect of the invention, the change of the possession state of the item in the game by exchange of the item between the player and the other player can also influence the price for transfer of the item, so that the game can be made more attractive.

BRIEF DESCRIPTION OF DRAWINGS

FIG. 3 is a view showing a method of determination of item price.

BEST MODE FOR CARRYING OUT THE INVENTION

An embodiment of the present invention will now be explained hereinafter, referring to appended drawings.

Figure 1:
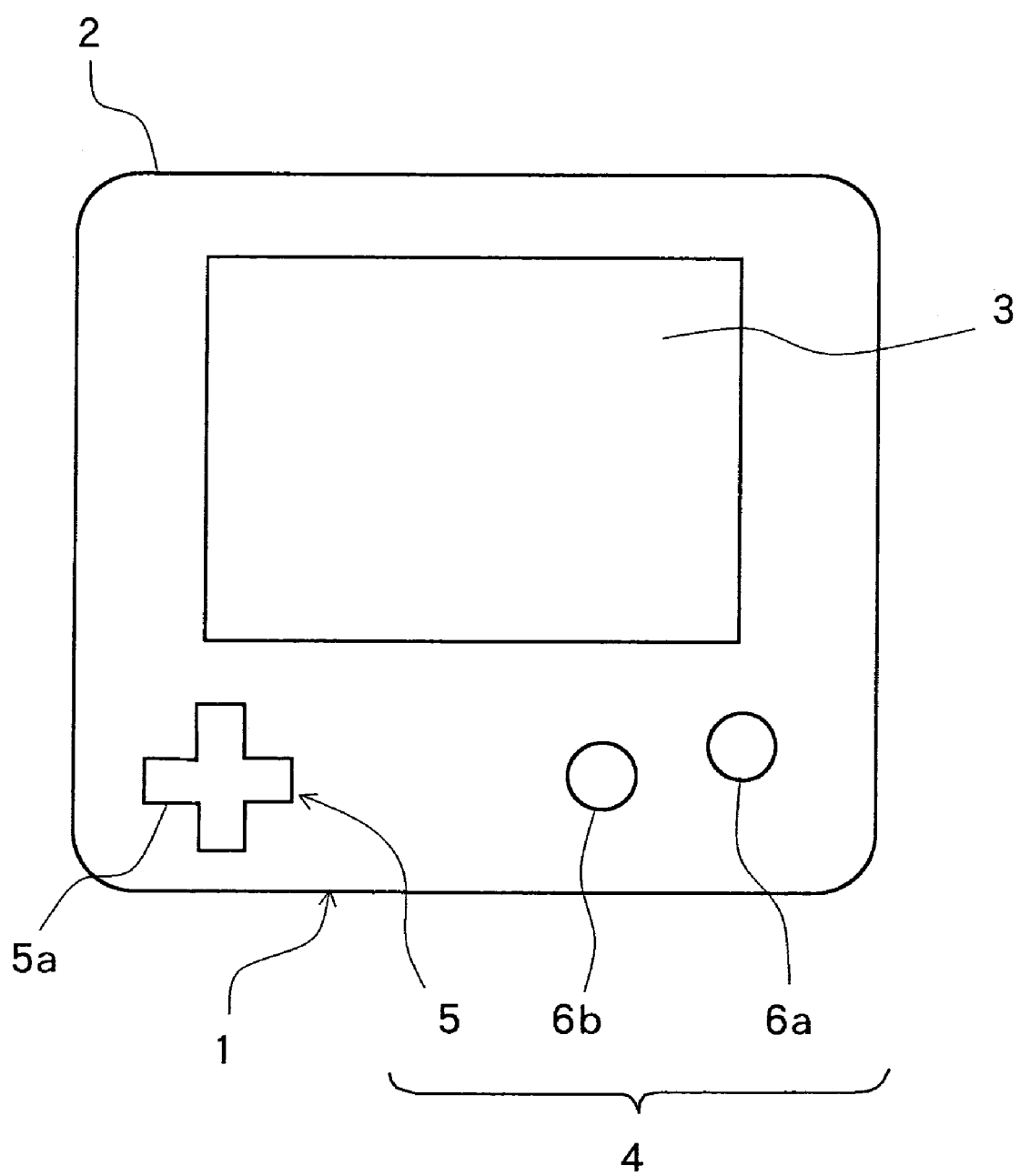
FIG. 1 is an external view of a portable game machine to which the present invention is applied.

FIG. 1 shows a portable game machine as a game machine comprising a game system. A portable game machine 1 has a main body 2, a liquid crystal display 3 as a display unit, attached to the main body 2 and an input device 4. The input device 4 has a direction indicator switch 5 and a plurality of push button switches 6a, 6b. The direction indicator switch 5 has a cross type of operation member 5a, for instance, and outputs a signal corresponding to an operation in up and down directions and in right and left directions of the operation member 5a (the operation of pushing down the end portion of the upper portion, the lower portion, the right portion or the left portion of the operation member).

A structure of such input device 4 is well-known, so various transformations are possible. For instance, four push buttons may be respectively located in upper and lower hands and in right and left hands, in place of the operation member 5a. The number of the push button switches 6a, 6b and their location may be changed in various forms. In the explanation described hereinafter, the push button switch 6a is referred to as A button, and the push button switch 6b is referred to as B button. But, both push button switches are expressed as a push button switch 6 when it is not necessary to differentiate both from each other. In addition, the game machine 1 is provided with a power switch, an operation member for adjusting sound volume and the like, but these are omitted.

Figure 2:
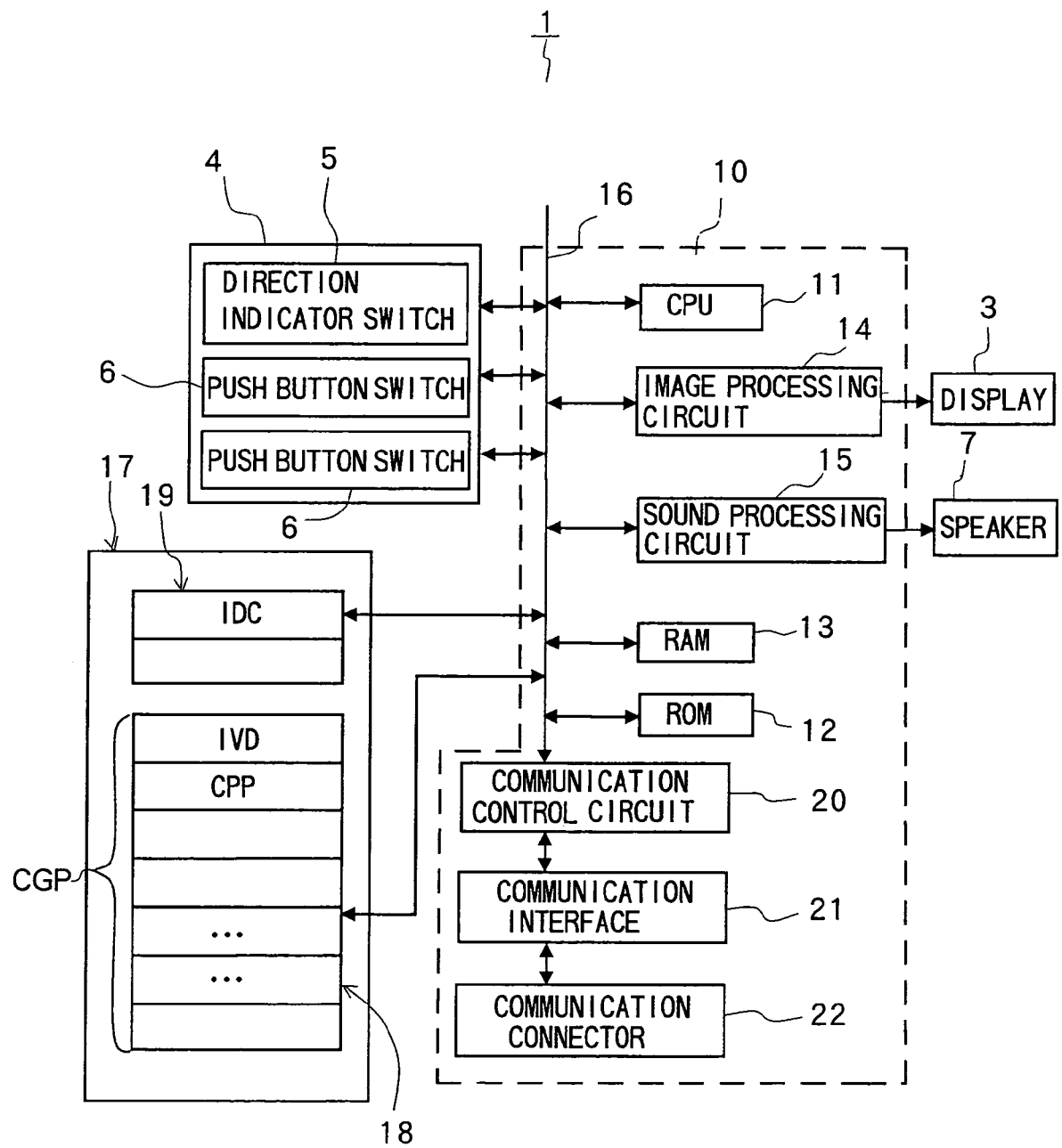
FIG. 2 is a control block diagram of the game machine of FIG. 1.

FIG. 2 shows a structure of a control unit 10 provided at the game machine 1. The control unit 10 is a computer making use of a microprocessor, main body of which is a CPU 11. A ROM 12 (read only memory) and a RAM 13 (random access memory) as main memories, an image processing circuit 14 and a sound processing circuit 15 are respectively connected with the CPU 11 through a bus 16. A program necessary for basic control of the game machine 1 (for instance, booting processing) is stored in the ROM 12. A work area with respect to the CPU 11 is secured in the RAM 13. The image processing circuit 14 controls the liquid crystal display 3 according to a picturing instruction from the CPU 11 so as to display a predetermined image on its picture. The sound processing circuit 15 produces an analog voice signal according to a pronouncing instruction from the CPU 11 so as to output to a speaker 7.

The respective switches 5, 6 of the input device 4 are connected with the CPU 11 through the bus 16, and the CPU 11 can thereby judge the state of operation of the respective switches 5, 6. Besides, an external memory 17, which is an object different from the control unit 10, is connected with the bus 16. The external memory 17 is comprised of a cartridge detachably attaching to the main body 2, for instance, and a ROM 18 as memory medium and a RAM 19 (readable and writable storage element) as a reloadable user memory are provided therein. Programs, such as a game program, and various data necessary for executing these programs are registered in the ROM 18 in advance. The reloadable ROM, such as a flash memory, is used as the memory 19, and save data of a game, for instance, are stored in the memory according to necessity. Various storage mediums, such as a magnetic storage medium, an optical storage medium and a photoelectric magnetic storage medium, may be used as the storage medium of the external memory 17, in addition to a semiconductor storage element. An interface circuit intervenes between the bus 16 and each element, if necessary, but this is not shown. Various kinds of the control units 10 may be used without limiting to the above-mentioned structure.

A communication control circuit 20 is connected with the CPU 11 through the bus 16 in order to connect the game machine 1 with a predetermined communication line, an another game machine or the like. A communication connector 22 is connected with the communication control circuit 20 through a communication interface 21. As the communication control circuit 20, one functioning as a modem or a network interface by combining a DSP (digital signal processor) and software with each other, for instance, may be utilized. The communication connector 22 and/or the interface 21 may be provided as a peripheral equipment to be connected with the game machine 1 outside.

The program stored in the ROM 18 of the external memory 17 is loaded to the RAM 13 so as to execute this program by the CPU 11 in the game machine 1 having the above-mentioned structure, and people can play various kinds of games on the scope of the display 3, thereby. Besides, the game machine 1 is connected with a predetermined network, controlling the communication control circuit 20, thereby messages can be exchanged and a pitched battle type of game can be enjoyed between this game machine 1 and an another game machine.

When a predetermined initializing operation (power-on operation, for instance) is executed in the game machine 1, the CPU 11 firstly executes predetermined initializing processing according to the program of the ROM 12. When initializing is finished, the CPU 11 starts to read game program CGP stored in the RAM 18 of the external memory 17, and starts game processing according to the program. When a player operates the input device 4 so as to execute a predetermined game start operation, the CPU 11 starts various kinds of control necessary for the execution of the game according to the procedures of the game program CGP.

In a game developed on the basis of the game program CGP, various items, such as cards, arms, accessories, magic, are sometimes transferred by buying or selling in a virtual game world which is structured with the game program CGP. When the possession state of the item is likely to be changed in the game with execution of a step of such item transfer in the game program CGP, a picture showing transfer of an item is displayed on the display 3 on the basis of the game program CGP. This picture is concretely an image showing an item shop or some kind of event, and various kinds of situations can be set therein. The CPU 11 reads out an item price determination program IVD which is stored in the game program CGP, and computes and determines the item price when executing the item transfer step on the basis of the item price determination program IVD.

In case of an event for transfer of various kinds of cards, such as "Card A", "Card B", "Card C", "Card D" and "Card E" in the game program CGP as shown in FIG. 3, the item price determination program IVD immediately reads individual data IDC of the card which is a subject for transfer out of the RAM 19 by a flag or a signal which informs of execution of a step for transfer of the item in the game program CGP. In the following explanation, cards are transferred as items. The items are not limited to the cards, but may be ones which are set as subjects for transfer during the game, such as magic, accessories and arms, as already mentioned.

As shown in FIG. 3, the individual data IDC of the card include data of name NAM of the respective cards, individual parameter data IPD for representing individual characteristic, such as strength and value of each card, and data concerning number of the cards (the items) in the game and the distribution of their possession state. That is, total number data HND for representing the total number of cards in the game, player possession data PHD for representing the number of the cards owned by a player, another player possession data AHD for representing the number of the cards owned by an another player excluding the player, a virtual player behaving by the CPU 11 as a player on the basis of the game program CGP, for instance, and transferable number data ACD for representing the number of the cards set by the game program CGP as a stock at a shop where transfer action is executed are stored. All or a part of the individual data IDC may be stored in the proper memories 12, 13 in the control unit 10, in addition to in the RAM 19.

The individual data IDC are successively changed as the game proceeds on the basis of the game program CGP. Especially, the data concerning the number of the items, such as the total number data HND, the player possession data PHD, the another player possession data AHD, and the transferrable number data ACD, and the distribution of their possession state are always changed by the action of transfer of the card, the action of acceptance of the card and the action of battle between players.

The change of the number of the items and their possession state by the action of acceptance of the card is made by the procedure wherein the player inputs a code shown on a card (a sheet shaped card made of paper or the like), which the player can buy at an outside store, in the portable game machine 1 through the input device 4, so that a new card to be used in the game with the game program CGP is produced by the CPU 11 on the basis of a card producing program CPP which is stored in the game program CGP so as to be registered as the player's possession card. And, the change by the action of battle between players is made by the procedure of movement of the card between the player and the virtual player by the CPU 11 or the other player connected through the communication connector 22 on the basis of the game program CGP by obtaining or giving the card from or to the other player due to the winning or defeat of the battle between both players. Furthermore, the change by the action of transfer also includes the change of the player's possession cards by executing the procedure for exchange of the cards between the player and the other player connected through the communication connector 22 on the basis of the game program CGP.

When changing the possession state concerning the item, such as the card, by the action of transfer of the card, the action of acceptance of the card or the action of battle between players in the game (including generation/register of a new item by accepting outside), the CPU 11 executes a procedure for writing and storing the individual data IDC concerning each card so as to correspond to the movement on the basis of the item price determination program IVD so that the individual data IDC of each card in the RAM 19 can be always a proper reflex of the game proceeding state.

After obtaining the individual data IDC of the card from the RAM 19, the item price determination program IVD gets the CPU 11 to compute the price of each item at the time of transfer, that is, sale price at an item shop when executing the step of transfer in the game program CGP at the item shop. The price is computed by the following equation as shown in FIG. 3, for instance.

$$\text{Sale price} = (T/S) * P * (50 - T)$$

T: Total number of cards (The sum total)
S: Transferable number of cards at item shop (Stock)
P: Individual parameter of card (Point)

But, the method of computing the price at the time of transfer is not limited to the above-shown equation. In the above-shown computation, the higher the rate of stock cards (S) with respect to total number (T) is during the game, that is, the higher the rate of stock at item shop is, the cheaper the sale price is. On the contrary, the lower the rate of stock cards (S) with respect to total number (T) is, that is, the lower the rate of stock at item shop is, the dearer the sale price is.

Besides, the sale price is set so as to be dearer in case where the individual parameter (P) of the card is high, through which big effects can be exhibited in a battle, for instance. Furthermore, the smaller the total number of cards which circulates in a game world is (fifty cards or lower) the dearer the sale price is owing to (50−T).

When the item price determination program IVD computes and determines the price of item for transfer at some point of time during the game developed on the basis of the game program CGP, the item price determination program IVD displays the determined price of the item at a proper display position on the display 3 through the CPU 11 and the image processing circuit 14.

Watching the price for transfer displayed on the display 3, the player operates the input device 4 to determine the card which he or she buys or sells, so that the player executes the action of transfer. As mentioned above, the price of the item is computed and determined by the item price determination program IVD every each item when the game program CGP executes the step of transfer of the item, so that the transfer price is fluctuated by the individual data IDC at the point of time concerning each item. Therefore, the player can buy or sell the item with reality similar to the actual economical activities.

When the player operates the input device 4 to designate a specified item as a subject for transfer, the CPU 11 executes a computing procedure for adding or subtracting an amount of money corresponding to the transfer price of the item (sale price) which is computed by the item price determination program IVD concerning the item to or from money which the player is to own in the game world, the money being stored in the RAM 19 so as to execute a procedure for renewing the money in possession by the player.

In the above-mentioned embodiment, the CPU 11 is the game control device, and the combination of the CPU 11 and specified software comprises various kinds of means of the game control device. But, at least a part of such means may be replaced with a logical circuit.

INDUSTRIAL APPLICABILITY

The item price determination program/means determines the price for transfer of the item, being changing by the individual data set for each item (such as, data concerning name of each card, individual parameter data representing individual characteristic, such as strength or value of each card, and data concerning number of the cards (items) in a game and distribution of their possession state, as shown in FIG. 3) so as to show to the player. Then, the player can buy or sell the item with reality similar to economical activities in the actual world, thereby increasing the reality and fun of the game.

The invention claimed is:

1. A game program embodied in computer readable medium for changing representation on a display connected with a computer on the basis of a predetermined program, through which a player can execute a game; comprising:
  a program for instructing said computer to execute the following procedures;
  a procedure for determining item price, for respectively computing prices for transfer at an item shop in a game world of a plurality of items to be used in said game every each item;
  a procedure for executing said procedure for determining item price when executing a step of transfer of at least one item of said plurality of said items used in said game in said game program;
    said procedure for determining item price having a procedure for computing price for transfer of said at least one item on the basis of individual data concerning each item and for displaying said price computed on said display;
    said individual data including data concerning names of respective said plurality of items, individual parameter data which indicates strength and value of respective said plurality of items, a whole number of said plurality of items in said game, a number of said plurality of items which said player or the other players have, and a number of said plurality of items set as transferable stock;
    said whole number of said plurality of items in said game being a total of the numbers of said plurality of items which said player has, the number of said plurality of items which the other players have, and the number of said items set as transferable stock;
  said game program further instructing said computer to execute a procedure for rewriting individual data for the purpose of changing of said individual data when transferring said item; and
  said procedure for determining item price having a procedure for computing said transfer price so that the higher a rate of said transferable stock to said whole number of said items at said item shop is, the lower said transfer price is, and the lower the rate of said transferable stock to said whole number of said items at said item shop is, the higher said transfer price is;
  wherein said transfer price of said at least one item at said item shop is determined by the product of the individual parameter of said at least one item and the ratio of said transferable stock at said item shop to said whole number of said plurality of items in said game.

2. A game program embodied in a computer readable medium for changing representation on a display connected with a computer on the basis of predetermined program, through which a player can execute a game; comprising:
  a program for instructing said computer to execute the following procedures:
    a procedure for determining item price, for respectively computing prices for transfer at an item shop in game world of a plurality of items to be used in said game every each item;
    a procedure for executing said procedure for determining item price when executing a step transfer of at least one item of said plurality of said items used in said game;
    said procedure for determining item price having a procedure for computing price for transfer of said at least one item on the basis of said individual data concerning each item and for displaying said price computed on said display;
    said individual data including data concerning names of respective said plurality of items, individual parameter data which indicates strength and values of respective said plurality of items, a whole number of said items in said game, a number of said items which said player or the other players have, and a number of said items set as transferable stock;
    said whole number of said items in said game being a total of the numbers of said plurality of items which said player has, the number of said plurality of items which the other players have, and the number of said plurality of items set as transferable stock;
  a procedure for registering en item, for registering a newly produced item by said game program on the basis of data inputted by said player through an input means as a possession of said player; and
  a procedure for rewriting individual data for the purpose of changing said individual data when registering said item produced by said procedure for registering said item as said possession of said player;
  said procedure for determining item price having a procedure for computing said transfer price so that the higher a rate of said transferable stock to said whole number of said plurality of items at said item shop is, the lower said transfer price is, and the lower the rate of said transferable stock to said whole number of said plurality of items at said item shop is, the higher said transfer price is;
  wherein said transfer price of said at least one item at said item shop is determined by the product of the individual parameter of said at least one item and the ratio of said transferable stock at said item shop to said whole number of said plurality of items in said game.

3. A game program embodied in a computer readable medium for changing representation on a display connected with a computer on the basis of a predetermined program, through which a player can execute a game, comprising:
  a program for instructing said computer to execute the following procedures:
    a procedure for determining item price, for respectively computing prices for transfer at an item shop in a game world of a plurality of items to be used in said game every each item;
    a procedure for executing said procedure for determining item price when executing a step of transfer of at least one item of said plurality of said item used in said game in said game program;
    said procedure for determining item price having a procedure for computing price for transfer of said at least one item on the basis of individual data concerning each item and for displaying said price computed on said display;
    said individual data including data concerning names of respective said plurality of items, individual parameter data which indicates strength and values of respective said plurality of items, a whole number of said plurality of items in said game, a number of said plurality of items which said player or the other players have, and a number of said plurality of items set as transferable stock;

said whole number of said plurality of items in said game being a total of the number of said plurality of items which said player has, the number of said plurality of items which the other players have, and the number of said items set as transferable stock;

a procedure for moving an item, for moving said item on the basis of said game program, which occurs between said player and an opponent player as a battle result between said both players; and a procedure for rewriting individual data for the purpose of changing said individual data when moving said item between said player and said opponent player by said procedure for moving an item; and said procedure for determining item price having a procedure for computing said transfer price so that the higher a rate of said transferable stock to said whole number of said plurality of items at said item shop is, the lower said transfer price is, and the lower the rate of said transferable stock to said whole number of said plurality of items at said item shop is, the higher said transfer price is;

wherein said transfer price of said at least one item at said item shop is determined by the product of the individual parameter of said at least one item and the ratio of said transferable stock at said item shop to said whole number of said plurality of items in said game.

4. A game program embodied in a computer-readable medium changing representation on a display connected with a computer on the basis of a predetermined program, through which a player can execute a game, comprising:

a program for instructing said computer to execute the following procedures:

a procedure for determining item price, for respectively computing prices for transfer at an item shop in a game world of a plurality of items to be used in said game every each item;

a procedure for executing said procedure for determining item price when executing a step of transfer of at least one item of said plurality of said items used in said game in said game program;

said procedure for determining item price having a procedure for computing price for transfer of said at least one item on the basis of individual data concerning each item and for displaying said price computed on said display;

said individual data including data concerning names of respective said plurality of items, individual parameter data which indicates strength and values of respective said plurality of items, a whole number of said plurality of items in said game, a number of said plurality of items which said player or the other players have, and a number of said items set as transferable stock;

said whole number of said plurality of items in said game being a total of a number of said plurality of items which said player has, a number of said plurality of items which the other players have, and a number of said plurality of items set as transferable stock;

a procedure for exchanging an item, for exchanging an item on the basis of said game program, which occurs between said player and an opponent player as a result of exchange of said item between said both players; and a procedure for rewriting individual data for the purpose of changing said individual data when exchanging said item between said player and said opponent player by said procedure for exchanging an item; and said procedure for determining item price having a procedure for computing said transfer price so that the higher a rate of said transferable stock to said whole number of said plurality of items at said item shop is, the lower said transfer price is, and the lower the rate of said transferable stock to said whole number of said plurality of items at said item shop is, the higher said transfer price is;

wherein said at least one transfer price of said item at said item shop is determined by the product of the individual parameter of said at least one item and the ratio of said transferable stock at said item shop to said whole number of said plurality of items in said game.

5. A game machine for changing representation on a display on the basis of a predetermined program, through which a player can execute a game, comprising:

means for determining item price, for respectively computing prices for transfer at an item shop in a game world of a plurality of items to be used in said game every each item;

means for executing said means for determining item price when executing a step of transfer of at least one item of said plurality of said item used in said game;

said means for determining item price having means for computing price for transfer of said at least one item on the basis of individual data concerning each item and for displaying said price computed on said display;

said individual data including data concerning names of respective said plurality of items, individual parameter data which indicates strength and values of respective said plurality of items, a whole number of said plurality of items in said game, a number of said plurality of items which said player has or the other players have, and a number of said plurality of items set as transferable stock;

said whole number of said plurality of items in said game being a total of the number of said plurality of items which said player has, the number of said plurality of items which the other players have, and the number of said plurality of items set as transferable stock;

said game machine further comprising:

means for rewriting individual data for the purpose of changing said individual data when transferring said at least one item;

said means for determining item price having means for computing said transfer price so that the higher a rate of said transferable stock to said whole number of said plurality of items at said item shop is, the lower said transfer price is, and the lower the rate of said transferarable stock to said whole number of said plurality of items at said item shop is, the higher said transfer price is;

wherein said transfer price of said at least one item at said item shop is determined by the product of the individual parameter of said at least one item and the ratio of said transferable stock at said item shop to said whole number of said plurality of items in said game.

6. A game machine for changing representation on a display on the basis of a predetermined program, through which a player can execute a game, comprising:

means for determining item price, for respectively computing prices for transfer at an item shop in a game world of a plurality of items to be used in said game every each item;

means for executing said means for determining item price when executing a step of transfer of at least one item of said plurality of said items used in said game;

said means for determining item price having means for computing price for transfer of said at least one item on the basis of individual data concerning each item and for displaying said price computed on said display;

said individual data including data concerning names of respective said plurality of items, individual parameter data which indicates strength and values of respective said plurality of items, a whole number of said plurality of items in said game, number of said plurality of items which said player has or the other players have, and number of said plurality of items set as transferable stock;

said whole number of said plurality of items in said game being a total of the number of said plurality of items which said player has, the number of said plurality of items which the other players have, and the number of said plurality of items set as transferable stock;

said game machine further comprising:

means for registering an item, for registering a newly produced item by said game machine on the basis of data inputted by said player through an input means as a possession of said player; and means for rewriting individual data for the purpose of changing said individual data when registering said item produced by said means for registering an item as said possession of said player;

said means for determining item price having means for computing said transfer price so that the higher a rate of said transferable stock to said whole number of said plurality of items at said item shop is, the lower said transfer price is, and the lower the rate of said transferable stock to said whole number of plurality of items at said item shop is, the higher said transfer price is;

wherein said transfer price of said at least one item at said item shop determined by the product of the individual parameter of said at least one item and the ratio of said transferable stock at said item shop to said whole number of said plurality of items in said game.

7. A game machine for changing representation on a display on the basis of a predetermined program, through which a player can execute a game, comprising:

means for determining item price, for respectively computing prices for transfer at an item shop in a game world of a plurality of items to be used in said game every each item;

means for executing said means for determining item price when executing a step of transfer of at least one item of said plurality of said items used in said game;

said means for determining item price having means for computing price for transfer of said at least one item on the basis of individual data concerning each item and for displaying said price computed on said display;

said individual data including data concerning names of respective said plurality of items, individual parameter data which indicates strength and values of respective said plurality of items, a whole number of said plurality of items in said game, a number of said plurality of items which said player has or the other players have, and a number of said plurality of items set as transferable stock;

said whole number of said plurality of items in said game being a total of the number of said plurality of items which said player has, the number of said plurality of items which the other players have, and the number of said plurality of items set as transferable stock;

said game machine further comprising:

means for moving an item, for moving said item which occurs between said player and an opponent player as a battle result between said both players; and means for rewriting individual data for the purpose of changing said individual date when moving said item between said player and said opponent player by said means for an moving item; and said means for determining item price having means for computing said transfer price so that the higher a rate of said transferable stock to said whole number of said plurality of items at said item shop is, the lower said transfer price is, and the lower the rate of said transferable stock to said whole number of said plurality of items at said item shop is, the higher said transfer price is;

wherein said transfer price of said at least one item at said item shop is determined by the product of the individual parameter of said at least one item and the ratio of said transferable stock at said item shop to said whole number of said plurality of items in said game.

* * * * *